US009749174B1

(12) United States Patent
Goff et al.

(10) Patent No.: US 9,749,174 B1
(45) Date of Patent: Aug. 29, 2017

(54) SYSTEM AND METHOD FOR DYNAMIC ALLOCATION OF CLOUD RESOURCES

(71) Applicant: Appcelerator, Inc., Mountain View, CA (US)

(72) Inventors: Michael Goff, San Francisco, CA (US); Wei Kong, San Francisco, CA (US)

(73) Assignee: Appcelerator, Inc., Mountain View, CA (US)

( * ) Notice: Subject to any disclaimer, the term of this patent is extended or adjusted under 35 U.S.C. 154(b) by 585 days.

(21) Appl. No.: 13/857,841

(22) Filed: Apr. 5, 2013

Related U.S. Application Data

(60) Provisional application No. 61/621,447, filed on Apr. 6, 2012, provisional application No. 61/621,982, filed on Apr. 9, 2012.

(51) Int. Cl.
*G06F 15/16* (2006.01)
*H04L 29/08* (2006.01)

(52) U.S. Cl.
CPC .............. *H04L 29/08153* (2013.01)

(58) Field of Classification Search
CPC .......................... H04L 29/00; H04L 29/08153
USPC ................................................. 709/226, 204
See application file for complete search history.

(56) References Cited

U.S. PATENT DOCUMENTS

| 6,119,235 | A  | * | 9/2000  | Vaid et al. ...................... 726/11 |
| 8,244,874 | B1 | * | 8/2012  | Thireault .............. G06F 9/5055 709/226 |
| 8,429,282 | B1 | * | 4/2013  | Ahuja et al. ................... 709/229 |
| 2004/0162901 | A1 | * | 8/2004 | Mangipudi ........... H04L 69/329 709/225 |
| 2004/0264481 | A1 | * | 12/2004 | Darling et al. ............... 370/401 |
| 2010/0251257 | A1 | * | 9/2010 | Kim et al. ..................... 718/105 |
| 2011/0016214 | A1 | * | 1/2011 | Jackson ........................ 709/226 |
| 2011/0202667 | A1 | * | 8/2011 | Kimball .............. G06F 17/3056 709/228 |

OTHER PUBLICATIONS

Kosta, S.; Aucinas, A.; Pan Hui; Mortier, R.; Xinwen Zhang, "ThinkAir: Dynamic resource allocation and parallel execution in the cloud for mobile code offloading," INFOCOM, 2012 Proceedings IEEE, vol., No., pp. 945,953, Mar. 25-30, 2012.*

(Continued)

*Primary Examiner* — Melvin H Pollack
*Assistant Examiner* — Messeret F Gebre
(74) *Attorney, Agent, or Firm* — Staniford Tomita LLP

(57) ABSTRACT

A system and method for dynamically allocating cloud resources includes receiving an application data request from a user and routing the request to a specific cluster of servers. Each application has a record in a database that contains a unique token along with subscriber information. Application requests to the service provider backend, are routed by DNS using an API endpoint name and originating geographic location to appropriate server clusters. When the request reaches the cluster, the load balancer extracts the application token from the URL, looks up the record in the database, and finds the subscriber plan and identity the application is associated with. A load balancer routes the data request to a specific cluster based upon the subscriber plan and identity. The clusters can have different processing speeds and features based upon the subscriber plan with premium plans having better performance than lower end plans.

16 Claims, 8 Drawing Sheets

(56) References Cited

OTHER PUBLICATIONS

M. E. Baran and F. F. Wu, "Network reconfiguration in distribution systems for loss reduction and load balancing," in IEEE Transactions on Power Delivery, vol. 4, No. 2, pp. 1401-1407, Apr. 1989.*
Reuven Cohen, "On the Computational Complexity and Effectiveness of N-Hub Shortest-Path Routi", vol. 16 Issue 3, Jun. 2008, pp. 691-704.*
Reuter, "Load control and load balancing in a shared database management system," 1986 IEEE Second International Conference on Data Engineering, Los Angeles, CA, USA, 1986, pp. 188-197.*
Motoishi, K.; Fukuda, , A, "Analysis of a queueing system with a load balancing mechanism", 1988: p. 640-2.*

* cited by examiner

Manage AwesomeApp (App Settings) (Logs) (Push Notification) (Email Templates)

| | |
|---|---|
| Status | Running |
| Description | A great app |
| Api Key | K7rTyKSL28PcqQFxiGX9[Hys2X4vD9Ap |
| Oauth Consumer Key | 4aHQZTxQXdqrnKxJfkcaKmXmH3qXsNhC |
| Oauth Secret | JicZbZsoS8ATgHw4HPBwZzPounCzTfLr |

Manage Data in AwesomeApp (Developer Preview)

A limited preview of upcoming app data management features s provided below. From your app, use the REST API and Client SKD to access the complete set of data viewing and editing features.

| | |
|---|---|
| (Show/Edit Users) | View user accounts |
| (Show/Edit Places) | Manage places in your app for checkins and mapping |
| (Show/Edit Checkins) | View checkins made by users |
| (Show/Edit Key-Values) | Manage Key-Value storage for flexible data |
| (Show/Edit Photos) | View photos uploaded by users |
| (Show/Edit Statuses) | View statuses set by users |
| (Show/Edit Posts) | View posts set by users |
| (Show/Send Messages) | Manage messages |
| (Show/Edit Events) | View events |

FIG.8

SYSTEM AND METHOD FOR DYNAMIC ALLOCATION OF CLOUD RESOURCES

CROSS REFERENCE TO RELATED APPLICATIONS

This application claims priority to U.S. Provisional Application No. 61/621,447, "System And Method For Dynamic Allocation Of Cloud Resources" filed Apr. 6, 2012 and U.S. Provisional Application No. 61/621,982, "System And Method For Dynamic Allocation Of Cloud Resources" filed Apr. 9, 2012. The contents of U.S. Provisional Application Nos. 61/621,447 and 61/621,982 are hereby incorporated by reference in their entirety.

BACKGROUND

Mobile software applications executed on mobile computing devices that utilize cloud-based resources are becoming more prevalent. These software applications request greater amounts of data and resources from cloud providers and, therefore, require efficient allocation and provisioning of resources from the cloud providers. It would be advantageous to allocate cloud-based resources to a software application based on the level of service agreed upon by the cloud provider and the provider of the software application that is intended to utilize the resources. Longer download times or failed downloads may result where resources of a cloud are overextended, thereby negatively impacting an end user's experience or the user's ability or desire to use a particular mobile application.

SUMMARY OF THE INVENTION

Embodiments of the present invention provide a system and method for dynamically allocating cloud resources that include receiving an application data request from a user and routing the request to a specific server, a cluster of servers of a cloud provider, or multiple clouds administered by a service provider. Each application is associated with a unique token, which is stored in a database along with subscriber information for the application, such as a subscription plan agreed upon by the service provider and the application's provider. When an application requests data from the service provider, the request is routed to an address identified by the domain name server ("DNS") for the domain associated with the request. The DNS may utilize geographic or other location-identifying information associated with the request in order to route the request to the appropriate server cluster or cloud, which may be located anywhere in the world. When the request reaches the cloud, a load balancer identifies the unique token associated with the application from the request, retrieves the corresponding record from the database, and determines the subscription plan. The load balancer then routes the data request to a specific server or cluster of servers based on the subscription plan.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 8 is an exemplary graphical user interface illustrating unique tokens for a mobile application that are used for managing a mobile application and identifying requests by the mobile application in accordance with an embodiment of the present invention.

Figure 1:
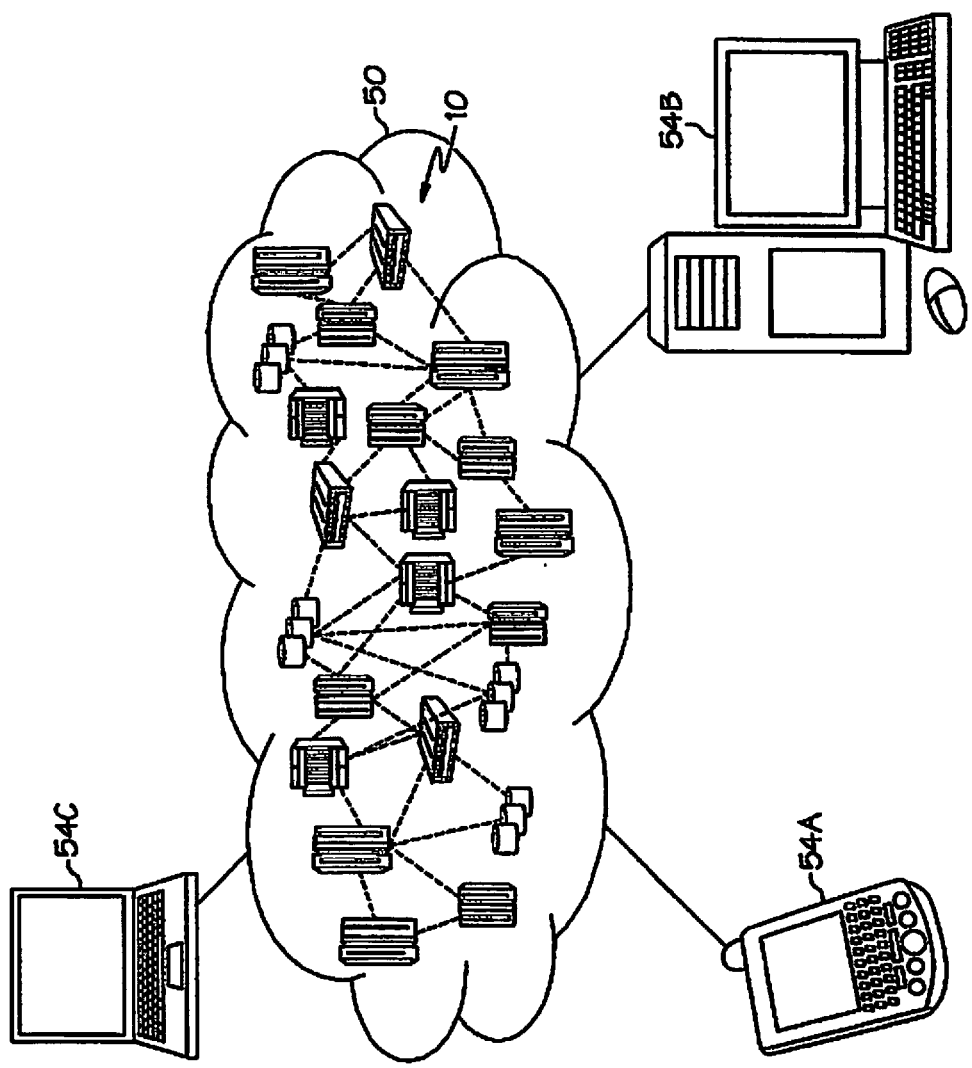
FIG. 1 is a diagrammatic representation of a cloud computing environment in accordance with an embodiment of the present invention.

Repeat use of reference characters in the present specification and drawings is intended to represent same or analogous features or elements of the invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention relate to dynamic allocation of cloud resources. As discussed in more detail below, a software application is created and registered with a service provider. The service provider creates a unique token that identifies the application and is associated with a subscription plan agreed upon by the service provider and the provider of the application. When an end user of the application causes the application to request data from the service provider, the request is routed to a load balancer associated with the service provider. The load balancer identifies the unique token for the application from the request. The load balancer retrieves the subscription plan associated with the application from a database based on the token. The load balancer routes the request to a server or cluster of servers in the cloud computing environment based on the subscription plan or other information associated with the application, as explained below. While the following explanation is directed to mobile applications, it should be understood that the explanation is also applicable to web applications, as well as other software applications, such as a desktop application. For purposes of explanation, the term "mobile application" should include mobile, web, and desktop applications.

As mentioned above, embodiments of the present application utilize a cloud computing environment. It should be understood that, although the ensuing explanation provides a detailed description of cloud computing, the scope of the embodiments of the present invention not limited to a cloud computing environment. Rather, embodiments of the present invention may be implemented in conjunction with any other type of computing environment now known or later developed. Nonetheless, FIGS. 1-3 and the description associated therewith provide an overview of the cloud computing environment.

Cloud computing is a model of service delivery for enabling convenient, on-demand network access to a shared pool of configurable computing resources {e.g., networks, network bandwidth, servers, processing, memory, storage, applications, virtual machines, and services) that can be rapidly provisioned and released with minimal management effort or interaction with a provider of the service. The cloud model described herein may include at least five characteristics, at least three service models, and at least four deployment models. These characteristics are as follows:

(1) On-demand self-service: a cloud consumer can unilaterally provision computing capabilities, such as server time and network storage, as needed automatically without requiring human interaction with the service's provider.

(2) Broad network access: capabilities are available over a network and accessed through standard mechanisms that promote use by heterogeneous thin or thick client platforms (e.g., mobile phones, laptops, and personal data assistants ("PDAs")).

(3) Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

(4) Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

(5) Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models are as follows:

(1) Software as a Service ("SaaS"): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(2) Platform as a Service ("PaaS"): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

(3) Infrastructure as a Service ("IaaS"): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

(2) Private cloud: the cloud infrastructure is operated solely for an organization. It may be managed by the organization or a third party and may exist on-premises or off-premises.

(3) Community cloud: the cloud infrastructure is shared by several organizations and supports a specific community that has shared concerns {e.g., mission, security requirements, policy, and compliance considerations). It may be managed by the organizations or a third party and may exist on-premises or off-premises.

(4) Public cloud: the cloud infrastructure is made available to the general public or a large industry group and is owned by an organisation selling cloud services.

(5) Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 illustrates a cloud computing environment 50 comprising one or more cloud computing nodes (illustrated generally at 10) with which local computing devices used by cloud consumers, such as, for example, a PDA, cellular telephone 54A, desktop computer 54B, laptop computer 54C, and/or other device may communicate. Nodes 10 may communicate with one another. They may be grouped physically or virtually, in one or more networks, such as Private, Community, Public, or Hybrid clouds as described above, or any combination thereof. This allows cloud computing environment 50 to offer infrastructure, platforms, and/or SaaS for which a cloud consumer does not need to maintain resources on a local computing device. It should be understood that the types of computing devices illustrated by FIG. 1 are intended to be illustrative only and that computing nodes 10 and cloud computing environment 50 can communicate with any type of computerized device over any type of network and/or network addressable connection (e.g., using a web browser).

Figure 2:
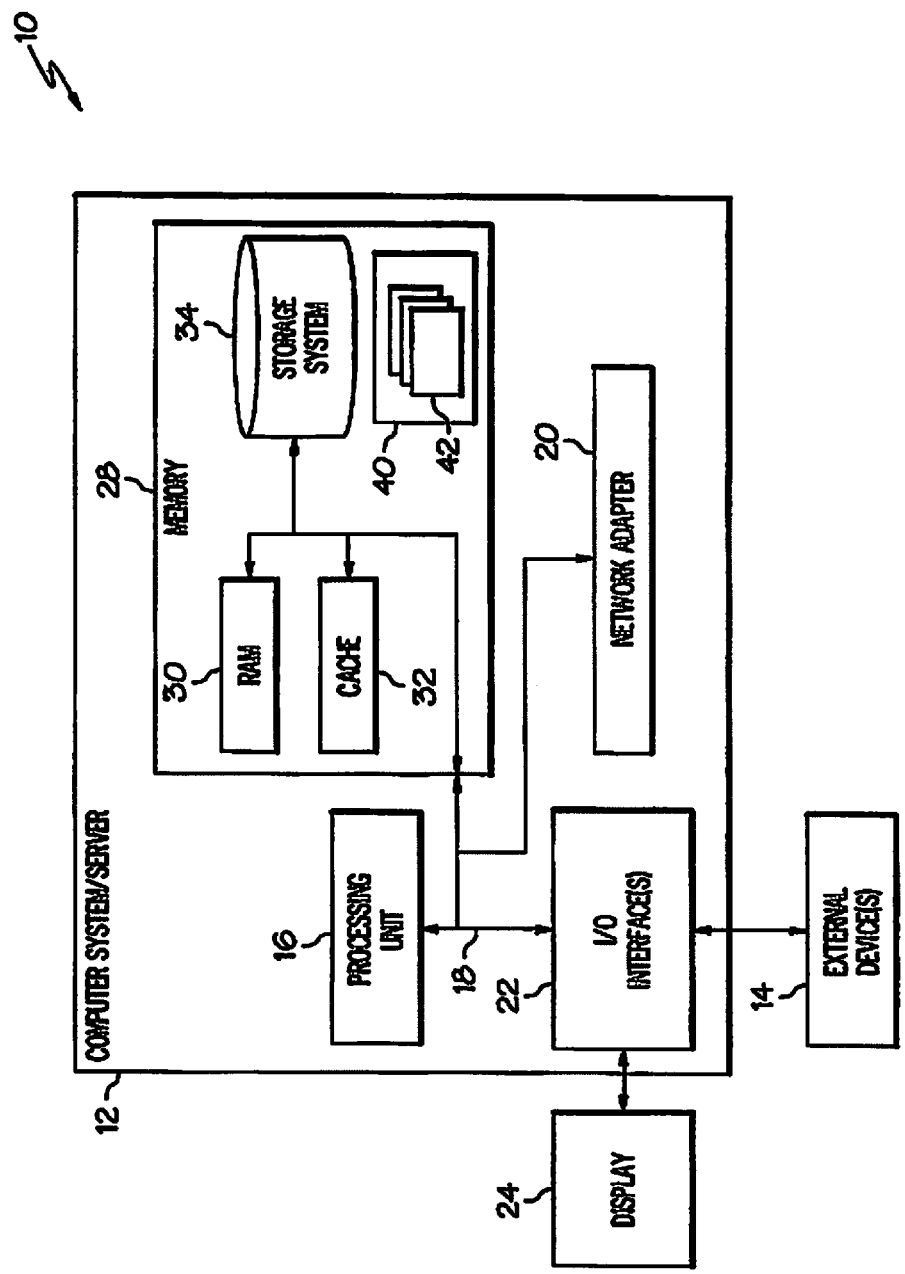
FIG. 2 is a diagrammatic representation of a computing node that may be used as any of the computing devices of the environment of FIG. 1 in accordance with an embodiment of the present invention.

FIG. 2 illustrates a schematic representation of an example of one of the cloud computing nodes 10 in accordance with an embodiment of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Referring to FIG. 2, cloud computing node 10 comprises a computer system/server 12 that is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network personal computers ("PCs"), minicomputer systems, mainframe computer systems, and distributed cloud computing environments that include any of the above systems or devices, and the like. For instance, devices 54A, 54B, and 54C of FIG. 1 may also comprise one or more computer systems 12.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As illustrated by FIG. 2, computer system/server 12 of cloud computing node 10 is shown in the form of a general-purpose computing device. The components of computer system/server 12 may include, but are not limited to, one or more processors or processing units 16, a system memory 28, and a bus 18 that couples various system components, including system memory 28, to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ("ISA") bus, Micro Channel Architecture ("MCA") bus, Enhanced ISA ("EISA") bus, Video Electronics Standards Association ("VESA") local bus, and Peripheral Component Interconnect ("PCI") bus.

Computer system/server 12 typically includes a variety of computer system readable media. Such media may be any available media that is accessible by computer system/server 12 and includes both volatile and non-volatile media, as well as removable and non-removable media.

System memory 28 can include computer system readable media in the form of volatile memory, such as random access memory ("RAM") 30 and/or cache memory 32. Computer system/server 12 may further include other removable/non-removable, volatile/non-volatile computer system storage media. By way of example only, a storage system 34 may be provided for reading from and writing to a non-removable, non-volatile magnetic media (typically referred to as a "hard drive"). A magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM, or other optical media, may also be provided. In such instances, each may be connected to bus 18 by one or more data media interfaces. As explained in more detail below, memory 28 may include at least one program product having a set (i.e., at least one) of program modules that are configured to carry out the functions of embodiments of the invention.

A program/utility 40, having a set of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment Program modules 42 generally carry out the functions and/or methodologies of embodiments of the invention as described herein.

Computer system/server 12 may also communicate with one or more external devices 14, such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output ("I/O") interfaces 22. Still yet, computer system/server 12 can communicate with one or more networks such as a local area network ("LAN"), a general wide area network ("WAN"), and/or a public network (e.g., the Internet) via a network adapter 20. As depicted, network adapter 20 communicates with the other components of computer system/server 12 via bus 18. It should be understood that other hardware and/or software components may be used in conjunction with computer system/server 12. Examples, include, but are not limited to: microcode, device drivers, redundant processing units, external disk drive arrays, RAID systems, tape drives, and data archival storage systems, etc.

Figure 3:
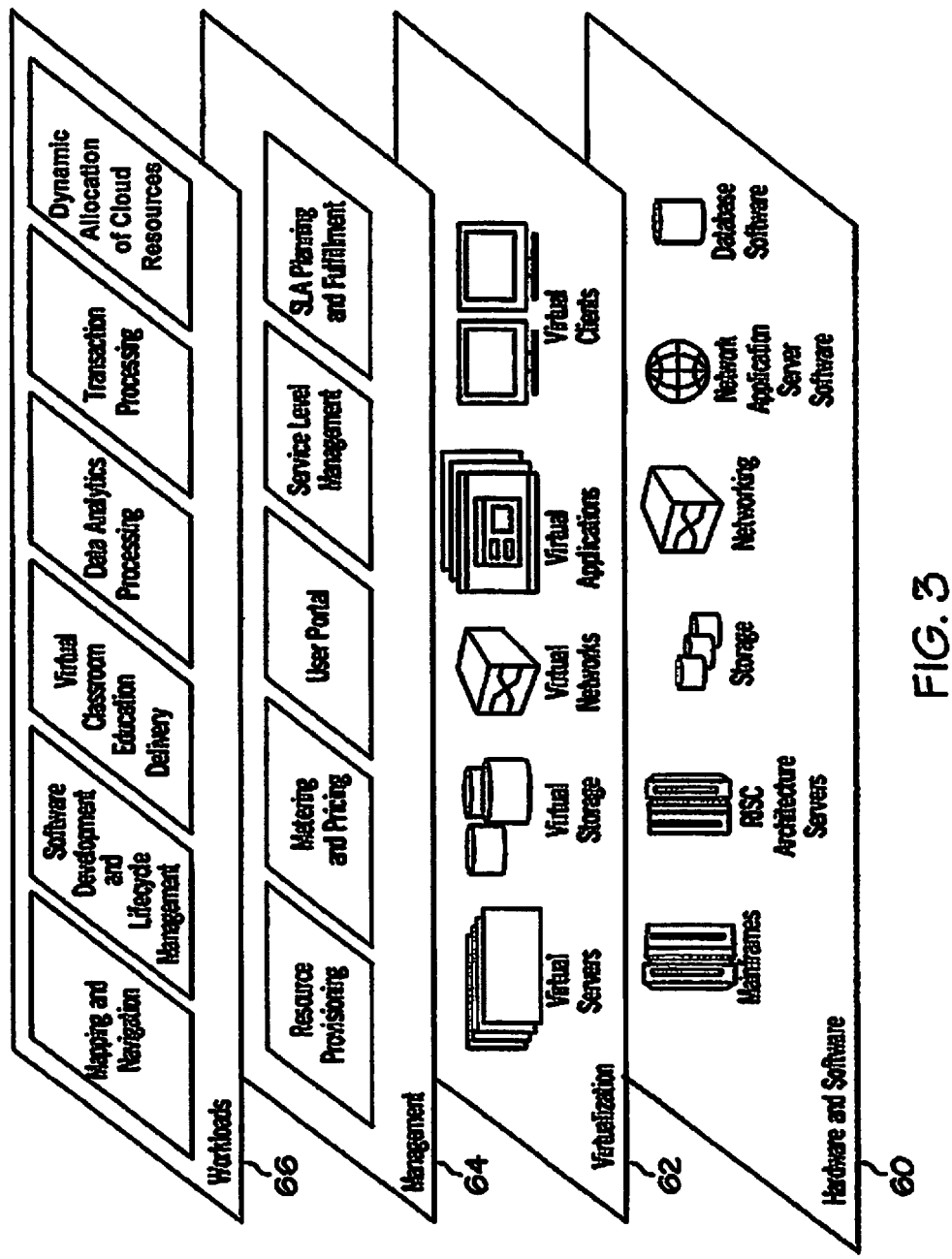
FIG. 3 is a diagrammatic representation of abstraction model layers of the environment of FIG. 1 in accordance with an embodiment of the present invention.

FIG. 3 illustrates a set of functional abstraction layers 60, 62, 64, and 66 provided by cloud computing environment 50 (of FIG. 2). It should be understood that the components, layers, and functions illustrated by FIG. 3 are intended to be illustrative only and embodiments of the invention are not limited thereto. The presently-described embodiment provide the layers and corresponding functions described below.

A hardware and software layer 60 includes hardware and software components. Examples of hardware components include mainframes, Reduced Instruction Set Computer ("RISC") architecture based servers, storage devices, networks, and networking components. Examples of software components include network application, server software, and database software.

A virtualization layer 62 provides an abstraction layer from which the following examples of virtual entities may be provided: virtual servers, virtual storage, virtual networks, including virtual private networks, virtual applications and operating systems, and virtual clients.

In one example, a management layer 64 may provide the functions described in more detail below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement ("SLA") planning and fulfillment provide pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation, software development and lifecycle management, virtual classroom education delivery, data analytics processing, transaction processing, and dynamic allocation of cloud resources, as described in more detail below.

Figure 4:
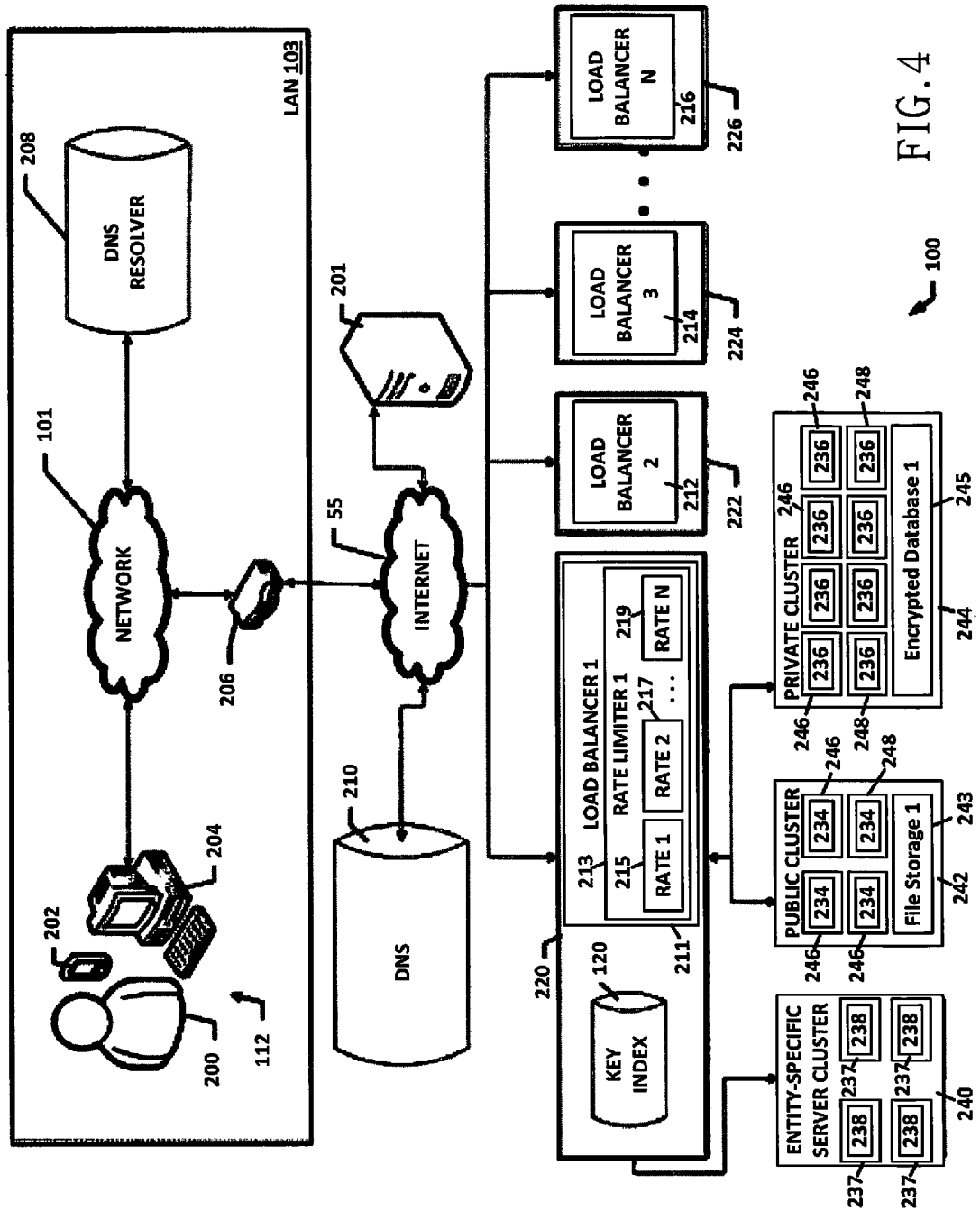
FIG. 4 is a schematic representation of a system configured to handle data requests and transmissions in accordance with an embodiment of the present invention.

FIG. 4 is a schematic representation of a system 100 configured to provide a data communications service. System 100 comprises a LAN portion 103 operatively connected to one or more cloud providers 220, a domain name system ("DNS") 210, a servicer 201 via a wide area network 55, such as the Internet. For ease of description network 55 is referred to herein as "Internet 55."

In this embodiment, LAN portion 103 comprises an endpoint 112 operatively connected to a DNS resolver 208 and a router 206 via a LAN 101. Endpoint 112 is associated with a user 200, a mobile device 202, and/or a computer 204. The following explanation provides a description of the system 100 with regard to mobile device 202, although it should be understood that computer 204 may be configured to utilize the components of system 100 in a manner similar to that described below.

For purposes of this explanation, router 206 is located within a geographical area proximate to mobile device 202. DNS resolver 208 for network 101 comprises a database that includes address information about the domains of Internet 55 that have been requested by devices of LAN portion 103, such as mobile device 202 and computer 204, as should be understood by those skilled in the art. It should be appreciated that DNS resolver 208 may be included within router 206. Those skilled in the art should appreciate that each of the components of system 100 may include one or more computing nodes 10 or other suitable computing devices.

DNS 210 is configured to provide address information about certain domains for which DNS 210 is an authoritative DNS, as should be understood in the art. In the presently-described embodiment, for instance, DNS 210 is an authoritative DNS for the domain(s) associated with cloud providers 220, 222, 224, and 226. In the embodiment illustrated by FIG. 4, each of these cloud providers includes a load balancer. It should be understood, however, that system 100 may utilize cloud providers that do not include a load balancer in other embodiments. It should also be understood that system 100 may utilize more or less cloud providers than those illustrated without departing from the scope of the present invention.

In the presently-described embodiment, each of cloud providers 220, 222, 224, and 226 is associated with at least one internet protocol ("IP") address and may be associated with one or more domain names, as explained in more detail below. It should be understood that the cloud providers in this example are physically located at various or different geographic locations. It should also be understood that the IP address associated with each cloud provider somewhat corresponds to the geographical location of the respective cloud. As a result, the cloud provider located closest in proximity to mobile device 202 (and, thus, network 100 and, specifically, device 206) may be selected to provide resources to an application executed by the mobile device when requested, as explained in more detail below.

It should be understood that load balancers 2 through N are substantially similar to load balancer 1 and are included to illustrate that system 100 may include multiple load balancers. Load balancer 1 is described in more detail below, but it should be understood that such discussion is equally applicable to load balancers 2 through N.

Load balancer 1 includes logic to receive and process a request for data communications from mobile device 202 and provide resources in response. Load balancer 1 comprises a database 120 that includes a table of application identities and subscription or "service" plans associated with each application. The load balancer 1 is configured to dynamically distribute network traffic and provide resources based on one or more client application metrics in response to requests received by cloud 220 from a mobile application. As explained below, these metrics include a combination of an application programming interface ("API") endpoint, application token, geographic location, subscriber identity, and subscriber subscription tier or plan that determines which backend server node or server cluster should service each request received from a mobile or web application. The functions and operations of each cloud and the respective load balancer are discussed in more detail below with respect to FIGS. 5 and 6.

Each load balancer may be connected to a series of servers or server clusters. As explained in more detail below, each request from a mobile application is provisioned to the tier that is selected by the mobile application developer based on the service plan that the mobile application developer contracts with the service provider. These tier levels may be defined by the different servers or server clusters accessible to a particular mobile application based on the service plan and may have differing levels of performance based on the service plan. In the presently-described embodiment, the varying tiers may include an entity-specific server cluster 240, a public server cluster 242, a private server cluster 244, or any other computing device(s) capable of providing resources in response to a request from a mobile application.

Entity-specific server cluster 240 includes one or more servers, which are allocated for a specific entity. For example, a specific entity, such as a particular company or corporation, may create an account with the service provider so that all requests from any mobile applications maintained by the entity are routed to and serviced by entity-specific server cluster 240. This allows the entity to ensure that the requests directed to this dedicated server cluster are used for requests by the entity's own application(s) and not for another entity. The entity may increase or decrease the amount of servers or other resources included in entity-specific server cluster 240 depending on the resources required by its application(s). While entity-specific server cluster 240 is illustrated as a single cluster, it should be understood that the entity-specific server cluster may be a series of server clusters. It should therefore be understood that cloud 220 may include multiple entity-specific service clusters 240 in order to allocate each such cluster to an entity that has negotiated a separate cluster to handle requests by its application(s). For example, one entity-specific server cluster may be designated for entity A, another entity-specific server cluster for Entity B, and so on.

Private server cluster (also referred to as "private cluster") 244 may include one or more fixed servers 246 and/or one or more dynamic servers 248. Fixed servers 246 are computing devices that can always remain available to private cluster 244, while dynamic servers 248 are computing devices that load balancer 1 can provision to the private cluster when necessary based on an increased number of requests for resources currently handled by the private cluster. The private cluster may only be available only to those entities associated with a service plan that includes use of the private cluster. For example, an entity may create an account with the service provider of clouds 220 and 222 includes the use of the private cluster. This enables the entity to have access to private cluster 244, which may include additional and faster resources in comparison to public cluster 242, described below. In different embodiments, the private cluster 244 may be shared by multiple entities.

Public server cluster (also referred to as "public cluster") 242 may include one or more fixed servers 246. The public cluster 242 may also include one or more dynamic servers 248, depending on the intended uses of the public cluster 242 without departing from the scope of the present invention. Thus, in some embodiments, the public cluster 242 may only have fixed servers 246 while in other embodiments, the public cluster 242 can have fixed servers 246 and one or more dynamic servers 248.

Fixed servers 246 or dynamic servers 248 in different clusters 240, 242, 244 may have varying hardware and software configurations that can change the performance, security, and other runtime behavior characteristics of the different clusters 240, 242, 244. For example, the different clusters 240, 242, 244 may have servers 246, 247, 248 that have different CPUs 234, 236, 238 that have different performance capabilities. In an embodiment, the entity-specific server cluster 240 may have entity-specific servers 237 with CPUs 238 that can provide information at a rate that is approximately four or more times faster than the predetermined standard or baseline computational processing speed of the CPUs 234 in the fixed servers 246 and dynamic servers 248 in the public cluster 242. The CPUs 238 in the entity-specific server cluster 240 may also be approximately two more times faster than the computational processing speed of the CPUs 236 in the fixed servers 246 and dynamic servers 248 in the private cluster 244. This improved performance can be an incentive to for users to upgrade their cloud services from the public cluster 242 service plans to private cluster 244 or an entity-specific server cluster 240 service plans.

In an embodiment, the processing speed of the entity-specific server cluster 240, the private cluster 244 and the public cluster 242 can be quantified as data output per time such as bits per second or requests processed per time such as requests per minute. As discussed, each cluster can include a plurality of servers with each server having one or more CPUs. Comparison of CPU speeds or instruction rates can be dependent upon many factors, such as the type of instructions being executed, the execution order and the presence of branch instructions. A common measure of CPU speed is millions of instructions per second (MIPS) which can be useful when comparing performance between different CPUs having a similar architecture.

In an embodiment, the processing speed of CPU 238 can be two or more times the processing speed of CPU 236 which can be two or more times the processing speed of CPU 234. This CPU speed can be based upon the cluster rather than the server. Thus, a fixed server 246 or a dynamic server 248 in the public cluster 242 can have a slower CPU 234 than the CPU 236 in a fixed server 246 or a dynamic server 248 in the private cluster 244. Similarly, a CPU 238 in the entity specific cluster 240 can be faster than the CPUs 236 in the private cluster 244.

In addition to different processing speeds, the entity-specific server cluster 240, the private cluster 244 and the public cluster 242 can also have other feature variations. For example, the public cluster 242 may have a larger amount of file storage 1 243 which can be used to store a large amount of files such as photos or other large data storage files. The entity-specific server cluster 240 and the private cluster 244 may also provide lower capacity storage unless their services are changed to increase their storage capacities. File storage 1 can provide a facility for users of public cluster to store large quantities of large file size documents such as photos. The private cluster 244 and the entity-specific server cluster 240 may also have file storage, but they provide lower capacity unless additional service fees are paid to upgrade the service plan. In an embodiment, the private cluster 244 may provide encrypted database 1 245 for secure storage of mobile application data.

In an embodiment, public server cluster 242 is available to entities that have not agreed to a service plan that includes entity specific server cluster 242 or private cluster 244. Additionally, in certain embodiments, entities that register to use the services provided by the system may default to a service plan that uses public cluster 242 to process requests from the entities' mobile application(s) until the entities contract with the service provider for a different service plan.

When using the inventive system, the different entities can register to use the system resources and select a service plan based upon their requirements. The default service plan on public cluster 242 may also include rate-limiting controls enforced by rate limiter 1 213 included in load balancer 1 211 to prevent over-utilization of shared resources. Requests sent at a higher rate than the subscriber has paid for will be rejected by rate limiter 1 213. The rate limit can be adjusted dynamically without any service interruption. As a result, if a mobile application developer upgrades from a free plan serviced by public cluster 242 to a premium plan serviced by private cluster 244, the request rate limit can be increased instantly by rate limiter 1 213 without any service interruption. The rate limit can be further broken down into varying predetermined service tiers (rate 1 215, rate 2 217 through rate N 219) so that various different levels of premium services can be provided to subscribers.

Different types of requests may have varying rate limits. For example, mobile applications requesting small pieces of data such as a user's birthday or other profile information may have rate limits of 100, 400, or 2,000 requests per minute depending on the provisioned service plan and cluster that the request is routed to. However, requests to upload large files such as photos may have rate limits of 10, 20, or 50 requests per minute with bandwidth limits of 0.5, 2, or 10 megabytes per second.

For security purposes, the rate limit could be set to zero "rate 0" by a system administrator or other authorized entity to stop mobile applications from accessing the provided services without affecting any other running mobile applications on the same or different server clusters. This is useful to prevent unintended or malicious usage of the server clusters such as distributed denial of service (DDOS) attacks.

To increase the request rate provided to subscribers of the private cluster 244 or entity-specific cluster 240, the number of servers can be increased dynamically (auto scale) without disrupting service. For example, the fixed servers 246 can always be available to the public clusters 242 and the private clusters 244. However, if additional resources are needed to meet the desired request rate, the dynamic servers 248 can be activated by the public clusters 242 and the private clusters 244. The desired request rate may increase due to an increase in usage by users of one or more mobile applications utilizing either type of cluster. In an embodiment, only mobile applications utilizing a paid premium service plan can benefit from auto scaling features provided by private cluster 244 or entity-specific cluster 240. Thus, if a mobile application utilizing a free plan provided by public cluster 242 requires additional capacity due to an increased requests rate, auto scaling may not occur, resulting in degraded performance when service requests sent by the mobile application.

Mobile applications with subscriptions to a free plan which exceed their rate limit, or which do not renew paid subscriptions, may be provided with limited access to a small set of features to enable debugging and other recovery tasks. Examples of these restricted features include viewing requests logs or bulk-downloading mobile application data from the server cluster.

Figure 5:
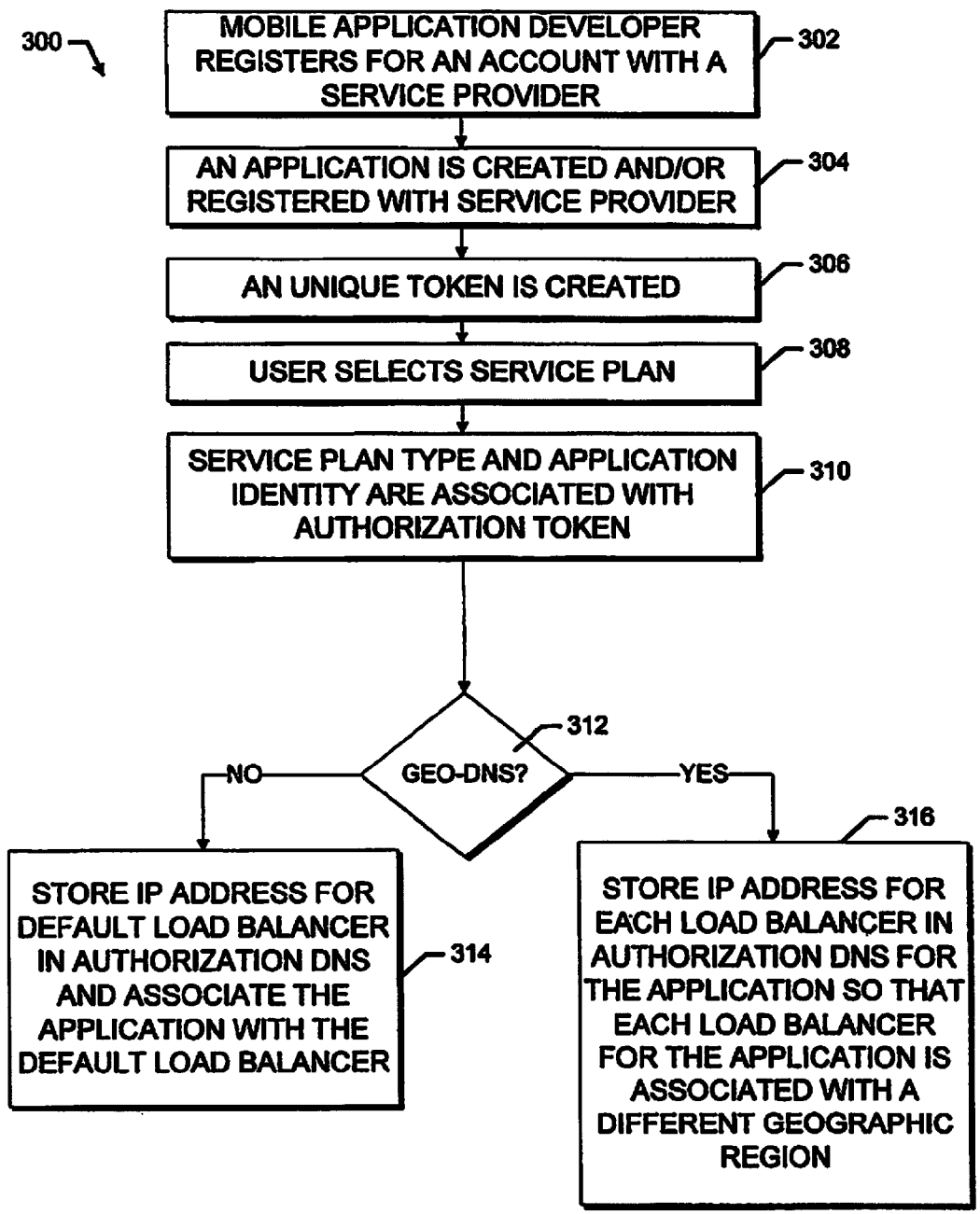
FIG. 5 is a flowchart illustrating an exemplary method for registering a mobile application in accordance with an embodiment of the present invention.
Figure 6:
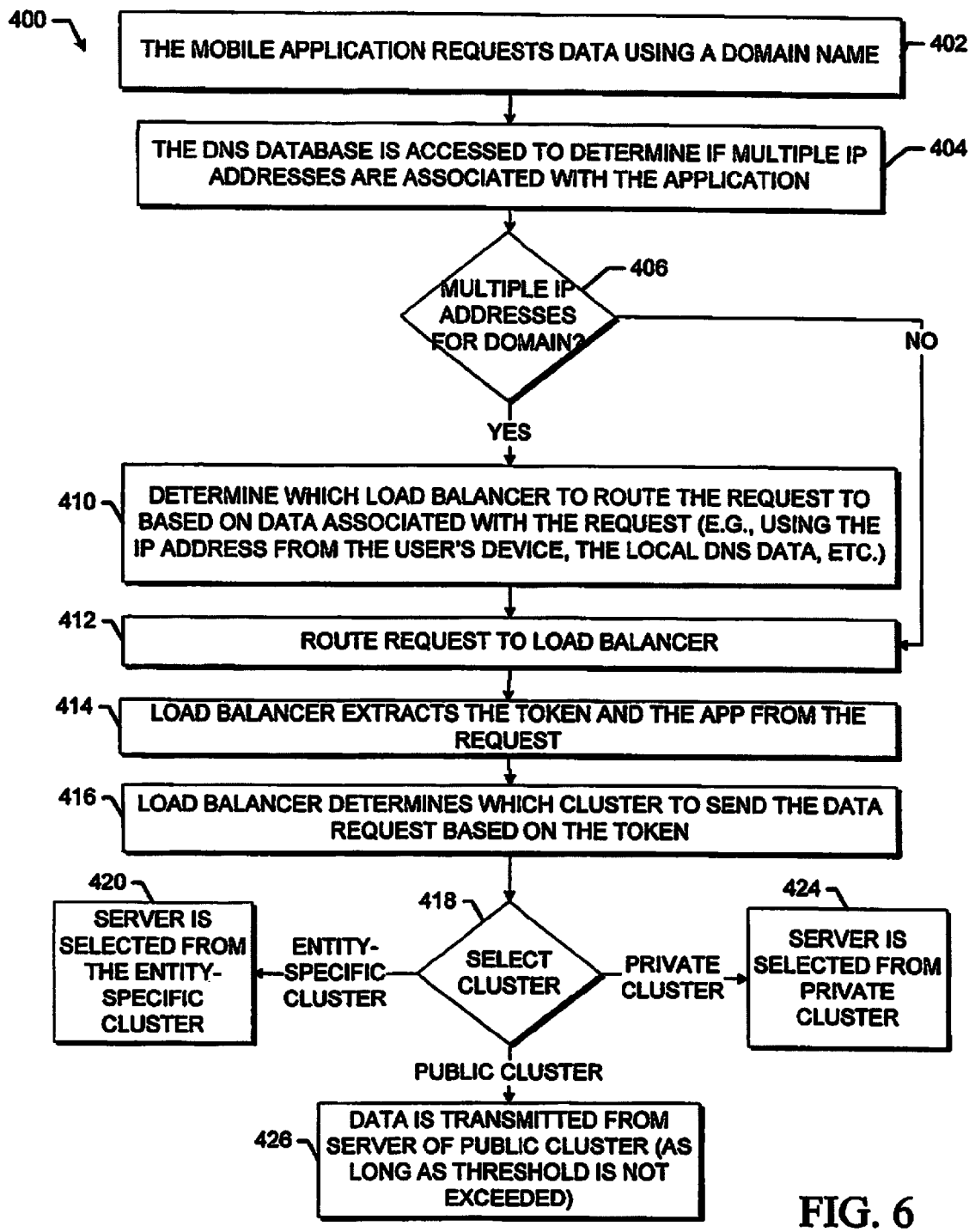
FIG. 6 is a flowchart illustrating an exemplary method for processing a data request in accordance with an embodiment of the present invention.

FIGS. 5 and 6 illustrate exemplary methods for registering an application to use system 100 and the manner by which the system handles requests by the application, respectively. While the ensuing explanation is directed to mobile applications, it should be understood that the explanation may be equally applicable to web and desktop applications. Thus, the use of "mobile application" and "application" herein is intended to encompass all application types. Each type uses system 100 in a manner similar to that described below, except where any differences are explained. The following explanation of the methods illustrated by FIGS. 5 and 6 is made with reference to system 100 of FIG. 4.

FIG. 5 is a flowchart illustrating an exemplary method 300 for registering a mobile application for use with system 100 in accordance with an embodiment of the present invention. At step 302, a mobile application developer or entity responsible for the application registers with the service provider of clouds 220, 222, 224, and 226 (shown in FIG. 4). In this example, the service provider is an entity that provides the varying tier servers/clusters and load balancing system 1, which directs data request to the clouds and server/clusters, as discussed above. The mobile application developer may register for an account with the service provider by providing information about the developer and what application(s) the developer owns or manages. It should be understood that, in one embodiment, the entity registering with the service provider need not be the entity that actually developed the mobile application but, rather, may be simply the owner of the mobile application.

Once the service provider receives the registration information (e.g., mobile application identity information, developer information, etc.) from the entity, the service provider enters and stores this information in database 120. The service provider then creates an account that the developer can log into in order to customize the developer's account.

When the developer logs into the service provider's website, the service provider's website provides the developer with options, such as an application creation tool, a service plan selection option, and an application registration tool. In the presently-described embodiment, for instance, the website provides the developer with documentation that explains how to use an application programming interface ("API") provided by the service provider that allows a mobile application to connect to and use the resources offered by the provider.

At step 304, the developer's mobile application is created and registered with the service provider. A mobile application, as used herein, relates to software that can be downloaded to a mobile computing device, such as a mobile phone. Such software may be an add-on software package that is installed by the operating system of the mobile computing device. Suitable mobile operating systems include the iOS mobile operating system provided by Apple Inc. of Cupertino, Calif., the Windows Mobile operating system provided by Microsoft Corporation of Redmond, Wash., or the Android operating system provided by Google Inc. of Mountain View, Calif. Mobile applications are typically available for download using an applications "store" resident on many smartphones. Examples of such stores include the App Store administered by Apple Inc. or the Android Appstore administered by Amazon.com, Inc. of Seattle, Wash. A mobile application, once downloaded, can perform various functions, which include requests for data or other resources from a server and/or database. Embodiments of the present invention relate to the processing of such data requests. Mobile applications, mobile operating systems, and mobile devices should be understood by those skilled in the art and are therefore not discussed in more detail.

Figure 7:
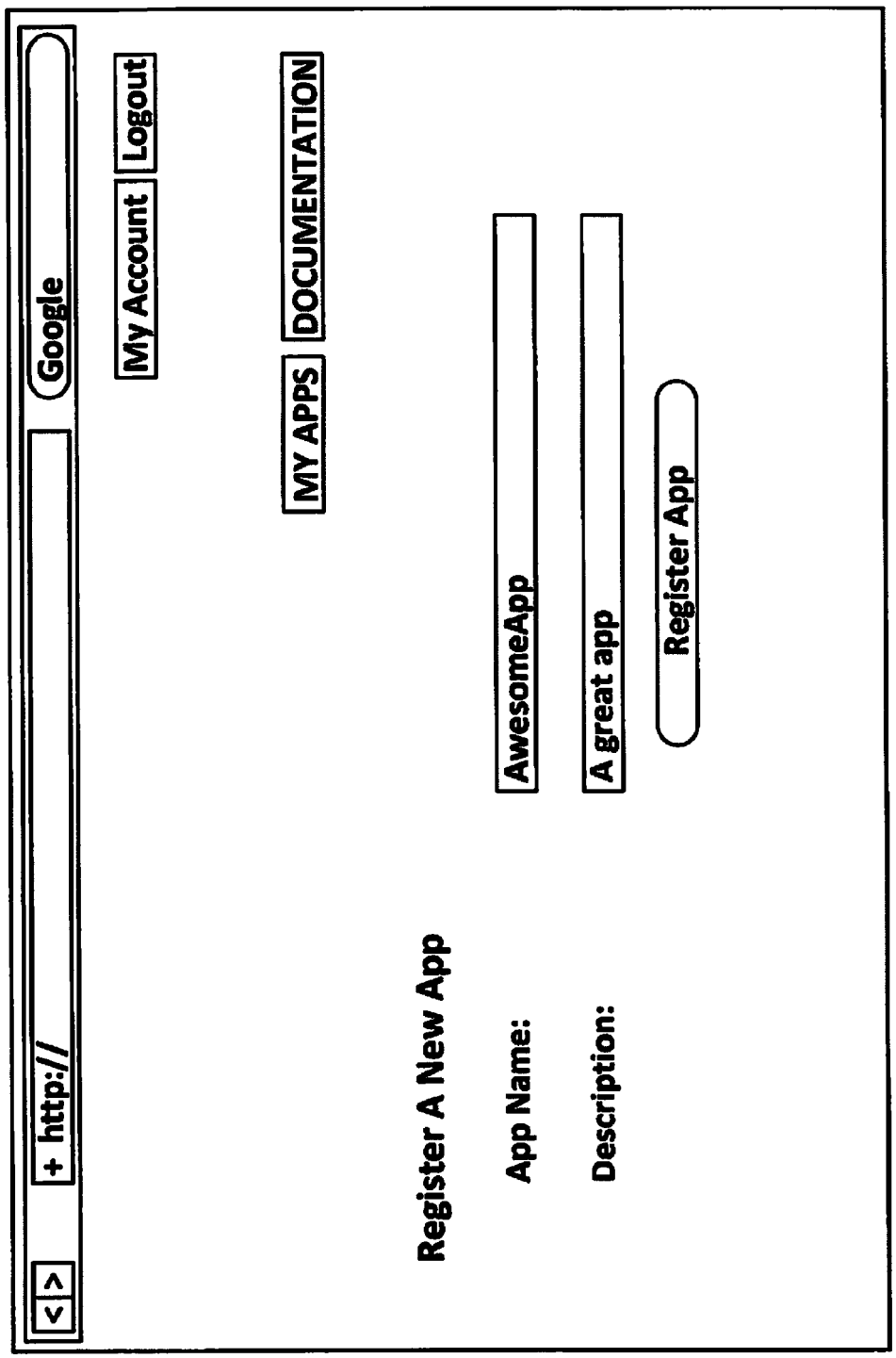
FIG. 7 is an exemplary graphical user interface that may be used for registering a mobile application in accordance with an embodiment of the present invention.

As previously mentioned, the service provider allows the developer to use an API to design a new application. However, the developer may have already created an application. Either way, after the mobile application is created, the developer registers the application with the service provider via its website. In one embodiment, the developer provides a title for the application and a brief description about the application (as shown in FIG. 7). It should be understood that a developer may create and register an account before creating the application. The developer may then use the API and related documentation provided by the service provider.

As a result of registration of the application, the service provider creates a token, at step 306, that uniquely identifies the application and provides the token to the entity. In the presently-described embodiment, the unique token for the application is a 32 character alphanumeric sequence, although it should be understood that other sequence types and lengths may be used without departing from the scope of the present invention. In this example, for instance, the service provider uses the SHA-1 cryptographic hash function to generated the unique token, as should be known in the art, although it should be understood that any other known method may be used as long as the token generated is unique to the application to which the token is associated. An example of such a token is illustrated in FIG. 8 (referred to therein as the "Api Key"). The service provider may create, and provide to the entity, other identifying information or tokens, such as an "OAuth Consumer Key" and "OAuth Secret," also as illustrated in FIG. 9. In the presently-described embodiment, these keys are also alphanumeric sequences, although it should be understood that any identity sequence may be used.

In one embodiment, any request from the mobile application is accomplished via the hypertext transfer protocol ("HTTP") over Transmission Control Protocol ("TCP") port 80 or via the secure HTTP ("HTTPS") over TCP port 443. Applications may make requests via HTTP, HTTPS, or a combination thereof. For instance, sensitive requests, such as user logins or other requests that involve confidential or sensitive data, including payment information, may be encrypted and transmitted via HTTPS, while other requests may use HTTP. It should be understood that the developer determines which protocol to use depending on the nature of the request and/or the data contained therein.

If the mobile application transmits a request to the service provider via HTTPS, the request may include the Api Key, which identifies the mobile application making the request. An example of such a request is:

curl-b cookies.txt-c cookies.txt-F "login=ABC@service-provider.com"-F "password=12345ABC" https://api.serviceprovidencom/vl/users/login.ison?key=vuFKq3tb7AQc5siifRAoBA BmORcSkfiS5

Curl (or "cURL") is a command-line tool for transferring data using various protocols, including HTTP and HTTPS, as should be understood by those skilled in the art. On the other hand, if the mobile application uses HTTP to make a request to the service provider, the mobile application makes an "OAuth" request using the OAuth Consumer Key and OAuth Secret sequences described above. As should be understood in the art, an OAuth request is an open standard that may be used to sign a request between a user and a service provider without the knowing involvement of the user. Additional information regarding OAuth requests are provided by Google Inc. and Microsoft Corporation, available at: http://oauth.googlecode.com/svn/spec/ext/consumer request/1.0/drafts/2/spec.html. and http://msdn.microsoft.com/en-us/library/live/hh243647.aspx. respectively, the contents of which are hereby incorporated by reference in their entirety as if set forth verbatim herein.

In the presently-described embodiment, the OAuth Consumer Key and OAuth Secret are used to create and send a signature in the request to the service provider. An example request using these two sequences is:

curl http:///api.serviceprovider.com//vl/photos/search.ison?oauth consumer key=ZFiY2GVElepMAsR7GSYxsyHxajUXuxRV&oauth nonce=F68D8461-802E-BE5E-73DB0DDD1D4F47A&oauth signature= KiebtCBgBlfC %2F4BxuP %2BNms % 2BYDug %3D& oauth signature method=HMAC- SHA1&oauth timestamp=132 3938206&oauth version=1.0&scope= user&user id=4ea7859278182- 67abb0 01568&suppress response codes=true&page= 6& session id=BOLeRQFqwg1 680ngfCmx iROIQ& per page=30 by created at(desc).

In step 308, the entity selects a service plan, which determines the cloud(s), tier, server, cluster of servers, etc. that system 100 uses to allocate resources to a mobile application when requested by the application, as described above. For example, the entity may select entity-specific server cluster 240, public cluster 242, or private cluster 244. If the entity selects the entity-specific server cluster as the service plan, for instance, load balancer 1 transmits requests made by the mobile application to the entity-specific server cluster, which provides data and other resources to the mobile application in response, as explained in more detail below with respect to FIG. 6. As explained above, the system stores the association of the mobile application, the unique token for the application, and the service plan in database 120, which occurs at step 310. As a result, the cluster associated with the mobile application services any request for data by the application once load balancer 1 determines the service plan associated with the mobile application based on the unique token included in the requests, as explained in more detail below.

At step 310, a domain name is provided to the entity by the service provider that the mobile application uses to direct its requests. That is, the developer of the mobile application programs the mobile application to use this domain name when making requests to the service provider. Alternatively, the developer may program the mobile application to use another domain name, such as a top level domain name owned by the entity, when making requests to the service provider. In such an embodiment, the developer may associate the domain name that the mobile application uses to make the requests with the domain name provided to the entity by the service provider. This may be accomplished by establishing a CNAME record with the authoritative DNS for the domain name that the mobile application uses to make requests, as should be understood by those skilled in the art.

As explained in more detail below, requests by a mobile application may be routed to a particular cloud provider based on the location of the request when made. In one embodiment, the entity determines whether to agree to a service plan that associates multiple cloud providers to an application based on a location associated with the request, at step 312. Alternatively, the service provider determines whether the application's request should be routed based on the request's originating location, at step 312. The service provider may implement this functionality by giving the entity a domain name associated with the IP addresses of multiple clouds, as described in more detail below.

If the entity does not select a service plan to use multiple cloud providers based on the location of each request made by the application, process flow proceeds to step 314. In this case, a domain name associated with the IP address for a particular cloud is provided for the mobile application to the entity by the service provider. The server provider stores the association of the domain name and IP address(es) for the domain name with the authoritative DNS for the top level domain name of the domain name provided to the entity, which may be accomplished prior to execution of method 300, as should be the understood in the art.

If the entity selects a service plan to use multiple cloud providers based on the location of each request made by the application at step 312, process flow proceeds to step 316. In this case, the service provider has associated the IP address for each cloud configured to handle requests made by the mobile application depending on the location of each request and stored the associations with the authoritative DNS for the top level domain name of the domain name provided by the entity. As explained in more detail below with respect to FIG. 6, when the mobile application issues a request using the domain name provided to the entity by the service provider, the authoritative DNS provides an IP address for a particular cloud based on the location of the request when made.

FIG. 6 is a flowchart illustrating an exemplary method 400 for processing a data request in accordance with an embodiment of the present invention. User 200 initiates a mobile application using mobile device 200. At step 402, the mobile application requests data from the service provider. Those skilled in the art should appreciate that the request may include any communication by the mobile application to the service provider, such as requesting data for the initial screen of the mobile application presented to the user, logging the user in to the service provided by the mobile application, determining the location of the user, etc. Those skilled in the art should appreciate that the mobile application may also request data and other resources from devices in addition to clouds 220, 222, 224, and 226, such as server 201. In an embodiment directed to a web application, for example, mobile device 202 or computer 204 initiates the application, such as by directing a web browser to a website, which may initially request data from server 201. In one embodiment, server 201 may then request data from the service provider. In another embodiment, mobile device 202 or computer 204 requests data from the service provider after or before receiving data from server 201. The process then continues in the manner described below regardless of the device that initiates the request to the service provider or whether the application is a mobile or web application. It should be understood, however, that the requestor receives any data returned by the service provider. That is, if server 201 requested data from a cloud, it may process the data before transmitting it to mobile device 202, in certain embodiments. If the mobile device requested resources from cloud 220, the cloud transmits the data to mobile device 202.

The data request is directed to the domain name programmed into the mobile application, as explained above. In order to route the request to the correct location, the operating system of the device making the request (mobile device 202 in this example) requests the IP address for the domain name from DNS resolver 208 of network 100 at step 404. If DNS resolver 208 includes a record associating the domain name with an IP address, it returns the IP address to the operating system. If not, DNS resolver 208 requests the IP address for the domain name from the authoritative DNS for the domain name, which, in this example, is DNS 210.

At step 406, DNS 210 determines if multiple IP addresses are associated with the domain name in its record. If so, DNS 210 analyzes the IP address attached to the DNS lookup request that made the request at step 410. In this example, the IP address for the DNS lookup request is the IP address of mobile device 202 that requested the DNS information. DNS 210 applies one or more filters and/or rules to the IP address of the requestor before it resolves the relevant domain name to an IP address associated with a cloud provider. In a preferred embodiment, the filters and rules perform a GeoDNS function so that the relative geographic location of the requestor is identified based on the IP address associated with the respective DNS request. DNS 210 may then select the IP address for the cloud based on the mobile device's geographic locations. Those skilled in the art should appreciate that the GeoDNS function may be performed by any suitable IP geolocation software applications or services, such as those provided by IP2Location of Penang, Malaysia and MaxMind of Boston, Mass. In the presently-described embodiment, DNS 210 resolves and returns the IP address of a cloud configured to handle the request by the mobile application based on the IP address of the requester. If the domain name is not associated with multiple IP addresses, DNS 210 returns the IP address associated with the domain name. In one embodiment, DNS 210 returns the IP address to resolver 208, which transmits the address to mobile device 202. In another embodiment, DNS 210 returns the IP address directly to the operating system of the device that requested it.

It should be understood that filters and rules other than those related to GeoDNS may be applied by DNS 210 in order to identify the cloud from which resources should be requested without departing from the scope of the present invention. For instance, it should be understood that other network addressing and routing methodologies, such as anycast, round-robin, or a random selection, may be utilized depending on the requirements and goals of the corresponding system. Such rules and filters, including GeoDNS, anycast, round-robin, and random functions, should be understood by those skilled in the art and are therefore not described in further detail.

Mobile device 202 directs the data request to the IP addressed provided to the mobile device's operating system and transmits the request over network 101 to router 206. At step 412, router 206 transmits the request to the IP address provided by DNS 210 for the domain name. In this example, the IP address provided by DNS 210 for the request is the IP address of cloud provider 220.

At step 414, load balancer 1 211 of cloud provider 220 receives the data request and extracts the unique token for the application from the request, retrieves the record for the application from database 120 based on the token, and identifies the service plan associated with the application from the record. Based on the service plan and the identity of the application, load balancer 1 211 identifies the server cluster configured to handle the data request at step 416. At step 418, load balancer 1 selects the cluster. For example, if the service plan for the application is private cluster 244, load balancer 1 transmits the request to the private cluster at step 424. By way of another example, if the application is associated with a service plan for entity-specific server cluster 240, load balancer 1 transmits the request to the entity-specific server cluster at step 420. Otherwise, load balancer 1 transmits the request to public cluster 242 at step 426.

The server cluster receives the request and performs the function(s) included in the request. Those skilled in the art should appreciate that the request may include a request for data, a request to perform one or more calculations, or any other request that the server cluster is configured to perform. For instance, the request can include instructions by the mobile application to retrieve pictures, music, or other files. Depending on the request, the server cluster may return data to the mobile application via load balancer 1, internet 55, router 206, network 101, and mobile device 202.

As will be appreciated by one skilled in the art, aspects of the present invention may be embodied as a system, method, or computer program product. Accordingly, aspects of the present invention may take the form entirely of hardware, entirely of software (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an electrically erasable programmable read-only memory (EEPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, a class may define an abstract characteristic of a thing or object, such as a group of code or instructions for performing a particular operation or function. The abstract characteristics may include characteristics of the thing or object, for example attributes, fields or properties, behaviors, such as functions or methods that can be performed by the class. An object is a particular instance of a class. The set of values of the attributes of a particular object is the state of the object. The object includes the state and the behavior that is defined in the object's class. A method is an object's abilities or functions the object can perform.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The-embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for dynamic allocation of cloud resources comprising:
   receiving by a server, first data requests for a first mobile software application registered with a first service provider and executed on a first mobile device;
   determining a geographic location of the mobile device when the first data requests are made;
   determining by the server, a first load balancer to receive the first data requests based on the first mobile software application and the geographic location of the mobile device wherein the first load balancer is part of a cloud provider that is closest to the geographic location of the mobile device;
   forwarding the first data requests from the server to the first load balancer;
   extracting by the first load balancer, first tokens from the first data requests, the first tokens identifying a first service plan associated with the first mobile software application, the first service plan having a first predetermined data rate;
   forwarding the first data requests from the first load balancer to a first server cluster specified by the first service plan and the first mobile application identity;
   performing the first data requests by the first server cluster at or below the first predetermined data rate;
   receiving by the server, second data requests for the first mobile software application;
   forwarding the second data requests from the server to the first load balancer;
   extracting by the first load balancer, the first tokens from the second data requests;
   forwarding the second data requests from the first load balancer to the first server cluster;
   determining by the first load balancer, that a first data rate of the second data requests for the first mobile software application is above the predetermined data rate and above the capacity of the first server cluster;
   performing the second data requests by the first server cluster at or below the first predetermined data rate;
   receiving by the server, a service plan change request that replaces the first service plan with a second service plan associated with the first mobile software application, the second service plan having a second predetermined data rate that is faster than the first predetermined data rate;
   determining by the first load balancer, that a first data rate of the second data requests for the first mobile software application is below the second predetermined data rate and above the capacity of the first server cluster;
   forwarding a portion of the second data requests from the first load balancer to a second server cluster; and
   performing the second data requests by the first server cluster and a second server cluster at or below the second predetermined data rate.

2. The method for dynamic allocation of cloud resources of claim 1 further comprising:
   receiving by the server, third data requests for the first mobile software application;
   forwarding the third data requests from the server to the first load balancer;
   extracting by the first load balancer, the first tokens from the third data requests;
   forwarding the third data requests from the first load balancer to the first server cluster;
   determining by the first load balancer, that a data rate of the third data requests for the first mobile software application is below the first predetermined data rate and above the capacity of the first server cluster;
   forwarding a portion of the third data requests from the first load balancer to a second server cluster; and
   performing the third data requests by the first server cluster and a second server cluster at or below the first predetermined data rate.

3. The method for dynamic allocation of cloud resources of claim 1 further comprising:
   receiving by the server, third data requests for a second mobile software application;
   forwarding the third data requests for the second mobile software application from the server to the first load balancer;
   extracting by the first load balancer, second tokens from the third data requests for the second mobile software application, the second tokens identifying the first service plan associated with the second mobile application;
   forwarding the third data requests from the first load balancer to the first server cluster;
   determining by the first load balancer, that a data rate of the first data requests for the first mobile software application combined with a data rate of the third data requests for the second mobile software application is above the first predetermined data rate and above the capacity of the first server cluster;
   forwarding a portion of the third data requests for the second mobile software application from the first load balancer to a second server cluster; and
   performing the third data requests for the second mobile software application by the first server cluster and a second server cluster at or below the first predetermined data rate.

4. The method for dynamic allocation of cloud resources of claim 1 further comprising:
   receiving by the server, third data requests for a second mobile software application;
   forwarding the third data requests for the second mobile software application from the server to the first load balancer;
   extracting by the first load balancer, third tokens from the third data requests for the second mobile software application, the third tokens identifying the second mobile application and a second service plan having a second predetermined data rate that is faster than the first predetermined data rate;
   forwarding the third data requests from the first load balancer to a second server cluster;
   determining by the first load balancer, that a data rate of the third data requests for the second mobile software application is below the second predetermined data rate and below the capacity of a second server cluster;
   forwarding the third data requests for the second mobile software application from the first load balancer to the second server cluster; and
   performing the third data requests for the second mobile software application by the second server cluster at or below the second predetermined data rate.

5. The method for dynamic allocation of cloud resources comprising:

receiving by a server, first data requests for a first mobile software application registered with a first service provider and executed on a first mobile device;

determining a geographic location of the mobile device when the first data requests are made;

determining by the server, a first load balancer to receive the first data requests based on the first mobile software application and the geographic location of the mobile device wherein the first load balancer is part of a cloud provider that is closest to the geographic location of the mobile device;

forwarding the first data requests from the server to the first load balancer;

extracting by the first load balancer, first tokens from the first data requests, the first tokens identifying a first service plan associated with the first mobile software application, the first service plan having a first predetermined data rate;

forwarding the first data requests from the first load balancer to a first server cluster specified by the first service plan and the first mobile application identity;

performing the first data requests by the first server cluster at or below the first predetermined data rate;

receiving by the server, second data requests for a second mobile software application;

forwarding the second data requests for the second mobile software application from the server to the first load balancer;

extracting by the first load balancer, second tokens from the second data requests for the second mobile software application, the second tokens identifying a second service plan associated with the second mobile software application having a second predetermined data rate that is faster than the first predetermined data rate;

forwarding the second data requests from the first load balancer to a second server cluster;

determining by the first load balancer, that a data rate of the second data requests for the second mobile software application is below the second predetermined data rate and above the capacity of a second server cluster;

forwarding a first portion of the second data requests for the second mobile software application from the first load balancer to a second server cluster;

forwarding a second portion of the second data requests for the second mobile software application from the first load balancer to a third server cluster; and performing the second data requests for the second mobile software application by the second server cluster and the third server cluster at or below the second predetermined data rate.

6. The method of claim 5 further comprising:

receiving by the server, third data requests for a third mobile software application, the third mobile software application being registered with a second service provider;

determining by the server, a second load balancer to receive the third data requests based on the second mobile software application;

forwarding the third data requests from the server to the second load balancer;

extracting by the second load balancer, third tokens from the third data requests, the third tokens identifying a second service plan associated with the third mobile software application, the second service plan having a second predetermined data rate that is faster than the first predetermined data rate;

forwarding the third data requests from the second load balancer to a second server cluster specified by the second service plan and the second mobile application identity; and performing the third data requests by the second server cluster at or below the second predetermined data rate.

7. The method of claim 5 wherein the first predetermined data rate comprises a first tier level of a plurality of tier levels defined by different servers including the server and comprising the cloud resources, and having differing levels of performance based a plurality of service plans including the first service plan.

8. The method of claim 5 wherein the first service plan is associated with the first mobile software application through a contract between a developer of the first mobile software application and the first service provider.

9. A method for dynamic allocation of cloud resources comprising:

receiving first data requests from a first mobile software application executed on a first mobile device;

determining a geographic location of the mobile device when the first data requests are made;

transmitting first data requests for a the first mobile software application to a first load balancer based on the geographic location of the mobile device wherein the first load balancer is part of a cloud provider that is closest to the geographic location of the mobile device;

extracting by the first load balancer, first tokens from the first data requests, the first tokens identifying a first service plan associated with the first mobile software application, the first service plan having a first predetermined data rate;

forwarding the first data requests from the first load balancer to a first server cluster based on the first service plan and the mobile application identity; and performing the first data requests by the first server cluster at or below the first predetermined data rate, wherein the first predetermined data rate comprises a first tier level of a plurality of tier levels defined by different servers including a server of the first server cluster, and having differing levels of performance based a plurality of service plans including the first service plan, and further wherein the first service plan is associated with the first mobile software application through a contract between a developer of the first mobile software application and a first service provider;

receiving by the first load balancer, second data requests;

extracting by the first load balancer, the first tokens from the second data requests;

forwarding the second data requests from the first load balancer to the first server cluster;

determining by the first load balancer, that a data rate of the second data requests for the first mobile software application is above the predetermined data rate and above the capacity of the first server cluster;

performing the second data requests by the first server cluster at or below the first predetermined data rate;

receiving by the first load balancer, a second service plan associated with the first mobile software application, the second service plan having a second predetermined data rate that is faster than the first predetermined data rate;

determining by the first load balancer, that a data rate of the second data requests for the first mobile software application is below the second predetermined data rate and above the capacity of the first server cluster;

forwarding a portion of the second data requests from the first load balancer to a second server cluster; and performing the second data requests by the first server cluster and a second server cluster at or below the second predetermined data rate.

10. The method for dynamic allocation of cloud resources of claim 9 further comprising:
  receiving by the first load balancer, third data requests;
  extracting by the first load balancer, the first tokens from the third data requests;
  forwarding the third data requests from the first load balancer to the first server cluster;
  determining by the first load balancer, that a data rate of the third data requests for the first mobile software application is below the first predetermined data rate and above the capacity of the first server cluster;
  forwarding a portion of the third data requests from the first load balancer to a second server cluster; and
  performing the third data requests by the first server cluster and a second server cluster at or below the first predetermined data rate.

11. The method for dynamic allocation of cloud resources of claim 9 further comprising:
  receiving by the first load balancer, third data requests for the second mobile software application;
  extracting by the first load balancer, second tokens from the third data requests for the second mobile software application, the second tokens identifying the first service plan associated with the second mobile application;
  forwarding the third data requests from the first load balancer to the first server cluster;
  determining by the first load balancer, that a data rate of the first data requests for the first mobile software application combined with a data rate of the third data requests for the second mobile software application is above the first predetermined data rate and above the capacity of the first server cluster;
  forwarding a portion of the third data requests for the second mobile software application from the first load balancer to a second server cluster; and
  performing the third data requests for the second mobile software application by the first server cluster and a second server cluster at or below the first predetermined data rate.

12. The method for dynamic allocation of cloud resources of claim 9 further comprising:
  receiving by the first load balancer, third data requests for the second mobile software application;
  extracting by the first load balancer, third tokens from the third data requests for the second mobile software application, the third tokens identifying the second mobile application and a second service plan having a second predetermined data rate that is faster than the first predetermined data rate;
  forwarding the third data requests from the first load balancer to a second server cluster;
  determining by the first load balancer, that a data rate of the third data requests for the second mobile software application is below the second predetermined data rate and below the capacity of a second server cluster;
  forwarding the third data requests for the second mobile software application from the first load balancer to the second server cluster; and
  performing the third data requests for the second mobile software application by the second server cluster at or below the second predetermined data rate.

13. The method for dynamic allocation of cloud resources comprising:
  receiving first data requests from a first mobile software application executed on a first mobile device;
  determining a geographic location of the mobile device when the first data requests are made;
  transmitting first data requests for a the first mobile software application to a first load balancer based on the geographic location of the mobile device wherein the first load balancer is part of a cloud provider that is closest to the geographic location of the mobile device;
  extracting by the first load balancer, first tokens from the first data requests, the first tokens identifying a first service plan associated with the first mobile software application, the first service plan having a first predetermined data rate;
  forwarding the first data requests from the first load balancer to a first server cluster based on the first service plan and the mobile application identity; and
  performing the first data requests by the first server cluster at or below the first predetermined data rate, wherein the first predetermined data rate comprises a first tier level of a plurality of tier levels defined by different servers including a server of the first server cluster, and having differing levels of performance based a plurality of service plans including the first service plan, and further wherein the first service plan is associated with the first mobile software application through a contract between a developer of the first mobile software application and a first service provider;
  receiving by the first load balancer, second data requests for the second mobile software application;
  extracting by the first load balancer, second tokens from the second data requests for the second mobile software application, the second tokens identifying a second service plan associated with the second mobile software application having a second predetermined data rate that is faster than the first predetermined data rate;
  forwarding the second data requests from the first load balancer to a second server cluster;
  determining by the first load balancer, that a data rate of the second data requests for the second mobile software application is below the second predetermined data rate and above the capacity of a second server cluster;
  forwarding a first portion of the second data requests for the second mobile software application from the first load balancer to a second server cluster;
  forwarding a second portion of the second data requests for the second mobile software application from the first load balancer to a third server cluster; and
  performing the second data requests for the second mobile software application by the second server cluster and the third server cluster at or below the second predetermined data rate.

14. The method of claim 13 further comprising:
  receiving by a second load balancer, third data requests;
  extracting by the second load balancer, third tokens from the third data requests, the third tokens identifying a second service plan associated with the second mobile software application, the second service plan having a second predetermined data rate that is faster than the first predetermined data rate;
  forwarding the third data requests from the second load balancer to a second server cluster specified by the second service plan and the second mobile application identity; and performing the third data requests by the first server cluster at or below the second predetermined data rate.

15. The method of claim 13 wherein the receiving by the first load balancer, third data requests;

extracting by the first load balancer, a third token from the third data request, the third token identifying the first service plan associated with the second mobile software application;

forwarding the third data requests from the first load balancer to the first server cluster specified by the first service plan and the second mobile application identity; and performing the third data requests by the first server cluster at or below the first predetermined data rate.

16. The method of claim 13 wherein the receiving by the first load balancer, entity specific data requests;

extracting by the first load balancer, entity specific tokens from the entity specific data requests, the entity specific tokens identifying an entity specific service plan associated with the entity specific mobile software application having a third predetermine data rate that is faster than the first predetermined data rate;

forwarding the entity specific data requests from the first load balancer to an entity specific server cluster specified by the entity specific service plan and the entity specific mobile application identity; and performing the entity specific data requests by the entity specific server cluster at or below the third predetermined data rate.

* * * * *